(12) United States Patent
Lim

(10) Patent No.: US 9,348,015 B2
(45) Date of Patent: May 24, 2016

(54) INTEGRATED RAINFALL ESTIMATION METHOD USING X-BAND DUAL-POLARIMETRIC RADAR MEASUREMENT DATA

(71) Applicant: KOREA INSTITUTE OF CONSTRUCTION TECHNOLOGY, Goyang-si (KR)

(72) Inventor: Sang Hun Lim, Goyang-si (KR)

(73) Assignee: KOREA INSTITUTE OF CONSTRUCTION TECHNOLOGY (KR)

( * ) Notice: Subject to any disclaimer, the term of this patent is extended or adjusted under 35 U.S.C. 154(b) by 201 days.

(21) Appl. No.: 14/307,792

(22) Filed: Jun. 18, 2014

(65) Prior Publication Data

US 2015/0145717 A1 May 28, 2015

(30) Foreign Application Priority Data

Nov. 26, 2013 (KR) .................. 10-2013-0144399

(51) Int. Cl.
*G01S 13/95* (2006.01)
*G01S 7/02* (2006.01)
(Continued)

(52) U.S. Cl.
CPC ................ *G01S 7/025* (2013.01); *G01S 7/292* (2013.01); *G01S 13/006* (2013.01); *G01S 13/951* (2013.01)

(58) Field of Classification Search
CPC ....... G01S 7/025; G01S 7/292; G01S 13/951; G01S 13/006
USPC ....... 342/26 R, 26 A–26 D, 90, 188, 189, 195
See application file for complete search history.

(56) References Cited

U.S. PATENT DOCUMENTS 6,081,220 A * 6/2000 Fujisaka ............... G01S 13/951
                                                    342/26 D
6,473,026 B1 * 10/2002 Ali-Mehenni .......... G01S 7/025
                                                    342/188
(Continued)

FOREIGN PATENT DOCUMENTS

FR       2933203 A1 *  1/2010 ............ G01S 13/953
FR       2960651 A1 * 12/2011 .............. G01S 7/411
(Continued)

OTHER PUBLICATIONS

V. Chandrasekar et al., "Dual-frequency dual-polarized Doppler radar (D3R) system for GPM ground validation: Update and recent field observations," Geoscience and Remote Sensing Symposium (IGARSS), 2012 IEEE International, Munich, 2012, pp. 346-349.*
(Continued)

*Primary Examiner* — John B Sotomayor
(74) *Attorney, Agent, or Firm* — Cantor Colburn LLP

(57) ABSTRACT

An integrated rainfall calculation method using X-band dual-polarimetric radar measurement data includes a precipitation classification step of classifying hydrometeors into four types of snow, rain/snow, rain and non-meteorological target through a fuzzy logic technique using a correlation coefficient (cross correlation coefficient, $\rho_{hv}$), features of a measured differential propagation phase ($\Psi_{dp}(r)$) or differential propagation phase ($\phi_{dp}$) and a signal-to-noise ratio (SNR) as input variables (input feature vector); a specific differential phase calculation step of separately calculating a specific differential phase by applying a specific differential phase using a total difference of differential phase and signal-attenuation corrected reflectivity for the rain among the classified hydrometeors and applying a specific differential phase calculated using a filtering method for the other hydrometeors; and a rainfall calculation step of calculating rainfall by using a relation between the specific differential phase and the rainfall and using the separately calculated specific differential phase.

10 Claims, 12 Drawing Sheets
(12 of 12 Drawing Sheet(s) Filed in Color)

(51) Int. Cl.
  *G01S 7/292* (2006.01)
  *G01S 13/00* (2006.01)

(56) References Cited

U.S. PATENT DOCUMENTS

| | | | | |
|---|---|---|---|---|
| 7,760,129 | B1 * | 7/2010 | Knight | G01S 7/025 342/188 |
| 2004/0201515 | A1 * | 10/2004 | Testud | G01S 13/95 342/26 R |
| 2005/0093734 | A1 * | 5/2005 | Alford | G01S 7/003 342/26 R |
| 2009/0315762 | A1 * | 12/2009 | Venkatachalam | G01S 13/951 342/26 R |
| 2015/0145717 | A1 * | 5/2015 | Lim | G01S 7/025 342/26 R |

FOREIGN PATENT DOCUMENTS

| | | | | |
|---|---|---|---|---|
| KR | 100931950 | | 12/2009 | |
| KR | 101131194 | | 3/2012 | |
| KR | 1020120125900 | | 11/2012 | |
| KR | 101408997 | B1 * | 6/2014 | G01S 13/956 |

OTHER PUBLICATIONS

E. Gorgucci, L. Baldini, V. Chandrasekar and M. Le, "Reflectivity and Differential Reflectivity Rainfall Algorithm Performance at X-band," Geoscience and Remote Sensing Symposium, 2008. IGARSS 2008. IEEE International, Boston, MA, 2008, pp. V-459-V-462.*

S. Yuehong, Z. Wanchang, L. Yonghe and Z. Jingying, "Analysis of Quantitative Estimation of Precipitation Using Different Algorithms with Doppler Radar Data," Education Technology and Training, 2008. and 2008 International Workshop on Geoscience and Remote Sensing. ETT and GRS 2008. International Workshop on, Shanghai, 2008, pp. 372-375.*

W. Li, V. Chandrasekar and G. Xu, "Investigations in radar rainfall estimation using neural networks," Geoscience and Remote Sensing Symposium, 2003. IGARSS '03. Proceedings. 2003 IEEE International, 2003, pp. 2347-2349 vol. 4.*

Giho Jang et al., A study on radar utilization technique, Global Environment System Research Team of National Institute of Meteorological Research, 2007, pp. 1-pp. 246.

Ganghoon Yun, Estimation of rainfall in X-band dual-polarimetric radar, Korea Institute of Construction Technology, Proceedings of Korea Society of Hazard Mitigation, Sep., 2003, pp. 23-27.

Mikyung Suk et al., Concentrative observation of dual-polarimetric radar in 2009: Classification of hydrometeors, National Institute of Meteorological Research, Proceedings of 2009 Autumn Conference of Korea Meteorological Society, 2009, pp. 76-77.

Hongpin Liu et al., Classification of Hydrometeors Based on Polarimetric Radar Measurements: Development of Fuzzy Logic and Neuro-Fuzzy Systems, and In Situ Verification, Journal of Atmospheric and Oceanictechnology, 1999, pp. 140-164.

J. Hubbert et al., An iterative filtering technique for the analysis of co-polar differential phase and dual-frequency radar measurements, American Meteorological Society, 1995, pp. 643-648.

* cited by examiner

INTEGRATED RAINFALL ESTIMATION METHOD USING X-BAND DUAL-POLARIMETRIC RADAR MEASUREMENT DATA

CROSS REFERENCE TO RELATED APPLICATIONS

This application claims priority to and the benefit of Korean Application No. 10-2013-0144399 filed on Nov. 26, 2013, in the Korean Patent Office, the entire contents of which are incorporated herein by reference.

BACKGROUND OF THE INVENTION

1. Field of the Invention

The present invention relates to a meteorological information acquisition method, and more specifically, to a system which integrates meteorological information related to precipitation of a target region, particularly, classification of hydrometeors, estimation of specific differential phases by a distributive method, and a rainfall estimation method according thereto.

2. Background of the Related Art

Meteorological phenomena are closely related to life, and accurate forecast of the meteorological phenomena is a very important problem. A numerical forecasting system reflecting a variety of variables is required in order to improve the ability of forecasting the meteorological phenomena, and various techniques for such numerical forecasting are developed diversely.

The most important source of obtaining basic information for the numerical forecasting is radar data, and results of studies using the radar data, such as estimation of precipitation, estimation of a wind field, very short range forecast of precipitation and the like, help weather forecasters improve accuracy of forecast in real-time using the radar data and a computer.

Dual-polarimetric radar drawing attention recently as a weather forecasting system is very advantageous for improving accuracy of precipitation measurement, classifying hydrometeors and controlling data quality compared with existing single polarimetric radar, by the nature of observation. Accordingly, a lot of researches and developments related thereto are performed in order to utilize the advantages.

Typically, the dual-polarimetric radar transmits horizontally and vertically biased electromagnetic waves, receives back scattering signals, and obtains a lot of information related to meteorological phenomena by analyzing the signals.

Since a precipitation particle is not in an exact circular shape, horizontal and vertical backscatter cross sections are different. The electromagnetic waves propagating through rainfall induce scattering, differential attenuation, differential phase shift and depolarization. Such a signal continuously changes while the electromagnetic waves proceed and has information for estimating a size, a shape, a direction and a thermodynamic phase of a precipitation particle.

Accordingly, improvement of accuracy in rainfall estimation, classification of hydrometeors, and quality control according to classification of meteorological echo and non-meteorological echo can be accomplished through radar observation. Particularly, in the case of polarimetric radar, differential reflectivity $Z_{dr}$, linear depolarization ratio (LDR), differential propagation phase $\phi_{dp}$, cross correlation coefficient ($\rho_{hv}$) and the like, as well as reflectivity ($Z_h$,v), Doppler velocity, and spectrum width observed by Doppler radar, can be observed, and studies on the types (properties) of objects (targets are mostly hydrometeors) and cloud physics can be conducted.

The most important thing among the meteorological information is precipitation. The precipitation has a great influence on life and works as one of most important information for coping with meteorological disasters such as heavy rain or heavy snow.

The precipitation is greatly affected by the type of hydrometeors or the size of hydrometeor particles. For example, a method of estimating precipitation for all types of hydrometeors regardless of the size thereof is not obtained yet, and since the types are very diverse, an equation itself for estimating precipitation based on the values observed through radar can be changed according to the type and size of a hydrometeor. Accordingly, for accurate estimation of precipitation, it is very important, first, to classify the type of hydrometeors and identify a precipitation type and, second, to accurately estimate the precipitation through the things closely related to the precipitation among the parameters obtained through observation.

First, observing the classification of hydrometeors, classification of radar observation targets will be more accurate if the types of hydrometeors are compared with each other, and although polarimetric observation variables for describing types of other hydrometeors are not clearly defined or overlapped, values of the observation variables are definitely different. If several hydrometeors are considered together, the hydrometeors are unclearly classified, and logic easily tends to be inaccurate. Therefore, a fuzzy logic method is used to classify the hydrometeors (Mandel, 1995).

A particle identification (PID) algorithm has been developed by Vivekanandan et al. in 1999, and a lot of studies on the PID algorithm in X-band dual-polarimetric radar are conducted recently. "Concentrative observation on dual-polarimetric radar in 2009: Classification of hydrometeors" presented by Mikyung Suk, Gyungyop Nam and Chunho Cho of National Institute of Meteorological Research in the Proceedings of 2009 Autumn Conference of Korea Meteorological Society disclosed a study on classification of particles into seventeen types based on seven input variables of horizontal reflectivity $Z_h$, differential reflectivity $Z_{dr}$, specific differential phase $K_{dp}$, cross correlation coefficient ($\rho$hv), temperature (T), standard deviation of differential reflectivity, and standard deviation of differential phase.

Here, fuzzy logic is used to classify hydrometeors as described above. According to the PID algorithm using fuzzy logic, first, a membership function and a value thereof according to a precipitation particle or a hydrometeor are obtained for each dual-polarization (radar) variable (fuzzification). This membership function becomes a fuzzy function itself in most cases, and the fuzzy function is obtained through empirical or statistical data. A one-dimensional trapezoidal function or a one-dimensional beta function is mainly used in the classification of hydrometeors. In addition, the function has a value between 0 and 1.

In addition, a membership function exists according to each dual-polarimetric variable (a threshold value of the variable) and a precipitation type in the inference step, and a weighted sum (Q) of each precipitation type can be determined by adding a product of an interest value (P) and a weight (W) of each variable of the precipitation type for all variables.

A maximum value (Max(Q)) of the weighted sum is identified, and this maximum value is determined as a precipitation form of a corresponding particle (defuzzification).

The membership functions (function values) may be defined as an empirical value of conditional probability for a value of a special variable to which an input variable of each echo belongs. For example, in an example of classifying rainfall and hail using horizontal reflectivity $Z_h$, differential reflectivity $Z_{dr}$ and a linear depolarization ratio (LDR) observed by radar as input values, a membership function value P for conditional precipitation classification can be determined as a value between 0 and 1 according to each hydrometeor type and input variable of six.

At the next step, a weighted value is determined for the membership function value determined above according to an observation value. For example, a weighted value of the horizontal reflectivity and the differential reflectivity may be respectively set to unit number 1, and a weighted value of the linear depolarization ratio may be set to 0.8.

Then, an aggregation value (Q) for classification of rainfall and hail is calculated by multiplying a membership function value by a weighted value of each of the three variables for the rainfall and adding the multiplied values of the three variables. Accordingly, the aggregation value can be obtained for hydrometeors of rainfall and hail through the rules and inference steps.

If the aggregation value of the rainfall is 1.7 and the aggregation value of the hail is 0.5, defuzzification of determining the hydrometeor in this region as the rainfall is performed.

The membership function, which is a function applied to a dual-polarimetric variable, is changed according to a threshold value of a variable, and determining the threshold value of the membership function is an important part of a study on the hydrometeor classification.

In addition, fuzzy logic of the fuzzification for calculating a specific function value by determining variables and membership functions and combining them has been disclosed in Classification of Hydrometeors Based on Polarimetric Radar Measurements: Development of Fuzzy Logic and Neuro-Fuzzy System, and In Situ Verification; JOURNAL OF ATMOSPHERIC AND OCEANIC TECHNOLOGY Volume 17, Hongping Liu and V. Chandrasekar, final form 27 Apr. 1999.

In addition, the present invention discloses a two-dimensional beta membership function (2D-MBF) configured in the form of multiplication of one-dimensional beta membership functions as shown below in equation 1.

$$\text{beta}(x, m, a, b) = \frac{1}{1 + \left[\left(\frac{x-m}{a}\right)^2\right]^b} \quad \text{[Equation 1]}$$

For example, if a one-dimensional membership function for rainfall with respect to horizontal polarization reflectivity $Z_h$ is $f_{rain\text{-}zh}$, it can be expressed as shown in equation 2.

$$f_{rain\_zh}(Z_H) = \frac{1}{1 + \left[\left(\frac{Z_H - 42.5}{18.17}\right)^2\right]^{18.32}} \quad \text{[Equation 2]}$$

When $Z_h$ and $Z_{dr}$ are dealt as variables independent to each other with respect to the rainfall, the two-dimensional membership function in a two-dimensional plane of $Z_h$–$Z_{dr}$ can be expressed through a graph shown in equation 3.

$$f_{rain\_zhzdr}(Z_H Z_{DR}) = f_{rain\_zh}(Z_H) \cdot f_{rain\_zdr}(Z_{DR}) \quad \text{[Equation 3]}$$

Meanwhile, the differential propagation phase $\phi_{dp}$ and the cross correlation coefficient $\rho_{hv}$, which are dual-polarimetric variables or parameters, can be obtained using a series of equations shown below.

First, microphysical properties of the rain medium can be described by drop size distribution (DSD).

In order to study shapes of DSD at rainfall rates changing in a wide region, natural change of the DSD can be expressed by a standardized (normalized) gamma function as shown in the following equations.

$$N(D) = N_w f(\mu)\left(\frac{D}{D_0}\right)^\mu e^{-\Lambda D} \quad \text{[Equation 4]}$$

$$\Lambda = \frac{3.67 + \mu}{D_0} \quad \text{[Equation 5]}$$

$$f(\mu) = \frac{6}{3.67^4} \frac{(3.67 + \mu)^{\mu+4}}{\Gamma(\mu + 4)} \quad \text{[Equation 6]}$$

At this point, $D_0$ denotes an equivolumetric median volume diameter (unit is mm), $\mu$ denotes a shape parameter, $N_W$ denotes a normalized intercept parameter of exponential distribution having the same water content and $D_0$.

Radar observation in the rain medium can be expressed from the aspect of the DSD, and reflectivity at horizontal and vertical polarization $Z_{h,v}$ can be defined as shown in the following equation.

$$Z_{h,v} = \frac{\lambda^4}{\pi^4 |K_w|^2} \int_{D_{min}}^{D_{max}} \sigma_{h,v}(D) N(D) dD; \; (\text{mm}^6 \text{m}^{-3}) \quad \text{[Equation 7]}$$

At this point, $\lambda$ denotes a wavelength of radar, $\sigma_{h,v}$ denotes a reflection cross section of radar at horizontal or vertical polarization, and $K_w$ denotes a dielectric factor of water defined as $K_w = (\in_r - 1)/(\in_r + 2)$ when $\in_r$ is a complex dielectric factor of water.

The differential reflectivity $Z_{dr}$ is a ratio of reflectivity factors at horizontal and vertical polarization and defined as shown in the following equation.

$$Z_{dr} = 10 \log_{10}(Z_h/Z_v) \quad \text{[Equation 8]}$$

In addition, the specific differential phase $K_{dp}$ (unit of deg/km) can be defined as shown in the following equation.

$$K_{dp} = \frac{180\lambda}{\pi} R \int [f_h(D) - f_v(D)] N(D) dD \quad \text{[Equation 9]}$$

At this point, R denotes the real part of a complex number, and $f_h$ and $f_v$ denote the size of forward scattering at horizontal and vertical polarization.

Real measurement values of dual-polarization rainfall radar are horizontal reflectivity $Z_h$ (mm$^6$/m$^3$), differential reflectivity $Z_{dr}$ (dB) and specific differential phase $K_{dp}$ (deg/km).

The differential propagation phase $\phi_{dp}$ between target positions r1 and r2 is defined using the specific differential phase as shown in the following equation.

$$\phi_{dp} = s \int_{r_1}^{r_2} K_{dp}(r) dr \quad \text{[Equation 10]}$$

The cross correlation coefficient $\rho_{hv}$ shows a correlation between signals at horizontal and vertical polarization and is defined through the equations shown below.

$$\rho_{hv} = \langle s_{vv} s_{hh}^* \rangle / [\langle |s_{hh}|^2 \rangle^{1/2} \langle |s_{vv}|^2 \rangle^{1/2}] \quad \text{[Equation 11]}$$

$$|\rho_{hv}(0)| = \left| \frac{\langle s_{vv} \cdot s_{hh}^* \rangle}{\langle s_{hh}^2 \rangle^{1/2} \cdot \langle s_{vv}^2 \rangle^{1/2}} \right| \quad \text{[Equation 12]}$$

At this point, $S_{hh}$ and $S_{vv}$ are relation variables between electric fields horizontally received when microwaves are horizontally transmitted and electric fields vertically received when microwaves are vertically transmitted in a backscattering matrix (Zrnic, 1991), and the asterisk symbol is a complex conjugate which means a difference of 90° in the phase, and the bracket symbols mean expectation of an element. Magnitudes of these variables are determined by the radio frequency of the radar and the size, the shape and the configuration (state) of a hydrometeor particle.

The differential propagation phase is a difference between horizontal and vertical propagation phases, which is proportional to the forward scattering property of a hydrometeor. In the case of a horizontally biased hydrometeor such as a raindrop, horizontal propagation phase shift is larger than vertical propagation phase shift. In addition, in the case of a non-meteorological echo, variations of the differential propagation phase are definitely larger than the variations of precipitation due to a poor correlation.

The cross correlation coefficient is affected by the variation in the horizontal-to-vertical ratio of an individual hydrometeor. A value of the cross correlation coefficient approaches 1 in the case of rainfall or ice crystal. In the case of melting snow or a mixed state, the cross correlation coefficient is smaller than 1. A low value of the cross correlation coefficient can be used to detect hail or precipitation of a mixed state or to detect contamination caused by ground clutter and non-meteorological scattering.

Weather radar can be divided into an S-band, a C-band, an X-band and the like according to used frequencies. To use properly X-band radar data, especially reflectivity and differential reflectivity, an attenuation correction is very important since the attenuation phenomenon caused by precipitation is severe in higher frequencies such as X-band.

Since a conventional method uses an attenuation correction data chiefly using reflectivity even in classifying hydrometeors, a problem occurs according this.

In addition, although the conventional method classifies a region having a correlation coefficient remarkably lower than 1 as a melting layer using the correlation coefficient and classifies a hydrometeor below the melting layer as rainfall and a hydrometeor above the melting layer as snowfall in many cases, there is a problem in that since the correlation coefficient shows a different aspect according to the signal-to-noise ratio, if a melting layer is determined and a hydrometeor is classified by simply using a constant correlation coefficient value in a region of a low signal-to-noise ratio, it is difficult to correctly classify the hydrometeor, and thus estimation of precipitation is confused.

Second, observing the conventional precipitation estimation, a method of estimating precipitation is largely divided into a method of estimating the precipitation through a relation between reflectivity and rainfall intensity and a method of estimating the precipitation through a relation between a specific differential phase and rainfall intensity.

A lot of studies show that a specific differential phase $K_{dp}$ accurately estimates rainfall in many cases. It is since that the specific differential phase is less sensitive to variations in the drop size distribution compared with an old method of using a relation between reflectivity and rainfall intensity (Z-R) (Sachidananda and Zrnic 1986; Matrosov et al. 2006; Cifelli and Chandrasekar 2010). Moreover, the specific differential phase is relatively less sensitive to hail.

Since X-band is more sensitive than S-band or C-band, using a specific differential phase may accomplish further better rainfall estimation at a high frequency compared with using the Z-R relation (Matrosov et al. 2002, 2006).

However, a disadvantage of the specific differential phase $K_{dp}$ is that the specific differential phase is calculated across a path length, not at the gate of each range. Conventionally, the specific differential phase is calculated as a mean slope of range profiles of the differential propagation phase $\Psi_{dp}(r)$ measured across a path and best fit across a specific path length. In order to estimate a specific differential phase from a measured differential propagation phase profile, Golestani et al. (1989) and Hubbert and Bringi (1995) used a filtering technique.

A general filtering method is a method of obtaining a specific differential phase by measuring changes of phase with respect to a unit distance (e.g., 1 km) after making a radio wave of a smooth shape overall by removing noises or the like from the radio wave by using a low pass filter several times by a user to be fit for the purpose, and this method works well in a rain region where microphysical properties do not abruptly change like stratiform rainfall. However, in a region of abrupt convective rainfall, a peak value of a specific differential phase is underestimated, and the specific differential phase even has a negative value. In addition, since the signal of the estimated specific differential phase changes greatly, it may vibrate severely even in a region showing a low rainfall rate (Wang and Chandrasekar 2009).

Wang and Chandrasekar (2009) have proposed an adaptive algorithm to reduce noises related to variations in a small segment and reduce deviation of estimation in a large segment. This method is configured to adjust regression errors through scaling for estimation of the specific differential phase. This method makes it possible to obtain a specific differential phase with an improved peak value even in a light rainfall region, as well as in a heavy rainfall region.

However, this method is based on a filtering method and thus inefficient for eliminating backscattering and solving the problem of negative specific differential phase values.

DOCUMENTS OF PRIOR TECHNIQUES

Patent documents (Patent document 1) Korea Patent Registration No. 10-1221773: Method of classifying meteorological echo and non-meteorological echo using dual-polarimetric radar.
(Patent document 2) Korea Patent Registration No. 10-0931950: Method of meteorological radar for classifying precipitation type.
(Patent document 3) Korea Patent Registration No. 10-1131194: Local precipitation radar system for vessels using X-band radar network.

Non-Patent Documents (Non-patent document 1) A study on radar utilization technique (I): 2007, Giho Jang et al., Global Environment System Research Team of National Institute of Meteorological Research.
(Non-patent document 2) Estimation of rainfall in X-band dual-polarimetric radar: Ganghoon Yun, Korea Institute of Construction Technology, Proceedings of Korea Society of Hazard Mitigation, September, 2003, Vol. 3, No. 3.

(Non-patent document 3) Concentrative observation of dual-polarimetric radar in 2009: Classification of hydrometeors; Mikyung Suk, Gyungyop Nam and Chunho Cho, National Institute of Meteorological Research, Proceedings of 2009 Autumn Conference of Korea Meteorological Society.

(Non-patent document 4) Classification of Hydrometeors Based on Polarimetric Radar Measurements: Development of Fuzzy Logic and Neuro-Fuzzy System, and In Situ Verification; JOURNAL OF ATMOSPHERIC AND OCEANIC TECHNOLOGY Volume 17, Hongping Liu and V. Chandrasekar, final form 27 Apr. 1999.

(Non-patent document 5) Golestani, Y., V. Chandrasekar, and V. N. Bringi, 1989: Inter-comparison of multi-parameter radar measurements. Preprints, 24th Conf. Radar Meteorology, Tallahassee, Fla., Amer. Meteor. Soc., 309~314.

(Non-patent document 6) Hubbert, J., and V. N. Bringi, 1995: An iterative filtering technique for the analysis of co-polar differential phase and dual-frequency radar measurements. J. Atmos. Oceanic Technol., 12, 643~648.

SUMMARY OF THE INVENTION

Therefore, the present invention has been made in view of the above problems of a conventional precipitation estimation method occurred in conducting meteorological observation using an integrated rainfall information processing system including X-band dual-polarimetric radar of big attenuation, and it is an object of the present invention to provide a method of further accurately estimating rainfall by classifying hydrometeors using raw observation data of the X-band dual-polarimetric radar and estimating a specific differential phase in a section of rainfall in a distributive method.

To accomplish the above object, according to one aspect of the present invention, there is provided a rainfall estimation method integrating X-band dual-polarimetric radar, the method including: a precipitation classification step of classifying hydrometeors into four types of snow, rain/snow, rain and non-meteorological target through a fuzzy logic technique using a correlation coefficient (cross correlation coefficient, $\rho_{hv}$), features of a measured differential propagation phase ($\Psi_{dp}(r)$) or differential propagation phase ($\phi_{dp}$) and a signal-to-noise ratio (SNR) as input variables (input feature vector); a specific differential phase estimation step of separately estimating a specific differential phase by applying a specific differential phase using a total difference of differential phase (calculated by a difference between a differential propagation phase at an end point of one radar beam ($\Psi_{dp}(r_m)$) and a differential propagation phase at a beginning point ($\Psi dp(r_0)$)) and signal-attenuation corrected reflectivity for the rain among the classified hydrometeors and applying a specific differential phase estimated using a filtering method for the other hydrometeors; and a rainfall calculation step of calculating rainfall by using a relation between the specific differential phase and the (amount of) rainfall.

The precipitation classification step of the X-band dual-polarimetric radar of the present invention for accomplishing the object may be accomplished by including the steps of: obtaining the signal-to-noise ratio (SNR), the correlation coefficient ($\rho_{hv}$) and the measured differential propagation phase ($\Psi_{dp}(r)$) as initial input data (variables) through radar electromagnetic wave transmission and reception data; classifying a melting layer and obtaining a mean height and a mean depth of the melting layer; determining a two-dimensional fuzzy function of a $\sigma(\Psi_{dp})$-SNR relation and a $10^{\rho_{hv}}$-SNR relation and calculating two fuzzy values (fuzzy function values) using the fuzzy function (fuzzification step); obtaining, after the fuzzification, an inference value for each target using a fuzzy value of the height and the previous two two-dimensional fuzzy values (fuzzy function values according to the $\sigma(\Psi_{dp})$-SNR and $10^{\rho_{hv}}$-SNR relations) (inference step); and performing quality control and determining a hydrometeor by selecting a maximum inference value (Max (RS)) among the inference values.

Here, in the step of obtaining the signal-to-noise ratio (SNR), the correlation coefficient ($\rho_{hv}$) and the measured differential propagation phase ($\Psi_{dp}(r)$) as initial input data through transmission and reception of electromagnetic waves of the radar, the correlation coefficient ($\rho_{hv}$) is converted into $10^{\rho_{hv}}$ to be used to expand a value, and a standard deviation $\sigma(\Psi_{dp}(r))$ of the measured differential propagation phase may be used as an input data of a fuzzy system. The standard deviation of the measured differential propagation phase is obtained through an equation generalized as shown below.

$$\sigma(\psi_{dp}(r)) = \sqrt{\frac{\sum_{j=r-\frac{N}{2}}^{r+\frac{N}{2}} [\psi_{dp}(j \neq r) - \psi_{dp}(r)]^2}{N}} \quad \text{[Equation 13]}$$

Here, r denotes a location, and N denotes the number of samplings in a section obtaining a deviation.

The measured differential propagation phase ($\Psi_{dp}$) has a relation with the differential propagation phase ($\phi_{dp}$) as shown in the following equation.

$$\psi_{dp} = \phi_{dp} + \delta \quad \text{[Equation 14]}$$

$\delta$ is a backscatter phase, which is a difference of arguments of the complex backscattering amplitudes of horizontal and vertical polarization. Accordingly, it is preferable to use a measured differential propagation phase when the backscattering is large.

In the step of classifying a melting layer and obtaining a height and a depth of the melting layer, the melting layer is determined considering the signal-to-noise ratio (SNR). For example, the melting layer may be classified by grasping to which hydrometeor classification region an individual observation data belongs on the $\sigma(\Psi_{dp})$-SNR plane and the $10^{\rho_{hv}}$-SNR plane as shown in FIGS. 1 and 2, and a mean height and a mean depth of the melting layer may be obtained by using measurement data belonging to the melting layer.

After classifying the melting layer, two fuzzy function values are calculated using a two-dimensional fuzzy function of the $\sigma(\Psi_{dp})$-SNR relation and the $10^{\rho_{hv}}$-SNR relation, which are the same as the boundary sections in the figures described above. Border lines which divide regions of hydrometeors on the $\sigma(\Psi_{dp})$-SNR plane and the $10^{\rho_{hv}}$-SNR plane may be used to determine the two-dimensional fuzzy function.

After the fuzzification, an inference value is obtained based on an inference rule shown in the following equation using a fuzzy value of the height and two two-dimensional fuzzy function values (fuzzy function values for beta membership function values according to $\sigma(\Psi_{dp})$-SNR and $10^{\rho_{hv}}$-SNR).

$$RS = f(H) \cdot (f(2D-MBF1) + f(2D-MBF2)) \quad \text{[Equation 15]}$$

Finally, in the step of performing quality control and determining a hydrometeor by selecting a maximum inference value (Max(RS)), it is confirmed for which hydrometeor the maximum inference value is, and a hydrometeor corresponding thereto is selected.

The step of estimating a specific differential phase separately estimates the specific differential phase by applying a specific differential phase as shown in the following equation using a total difference of differential phase (calculated by a difference between a differential propagation phase at an end point ($\Psi_{dp}(r_m)$) of one radar beam and a differential propagation phase at a beginning point ($\Psi dp(r_0)$)) and signal-attenuation corrected reflectivity for the rain among the classified hydrometeors and applying a specific differential phase estimated using an existing filtering method for the other hydrometeors.

$$\hat{K}_{dp}(r) = s[\hat{Z}_h(r)]^b ; a = \frac{(\psi_{dp}(r_m) - \psi_{dp}(r_0))}{2\int_{r_0}^{r_m} [\hat{Z}_h(r)]^b ds}$$

In this equation, $\Psi_{dp}(r_m)$ and $\Psi dp(r_0)$ are differential propagation phases at an end point and a differential propagation phase at a beginning point of rainfall measured by one radar beam.

Calculating rainfall through the obtained specific differential phase is accomplished by using a relation between the specific differential phase and rainfall intensity, which is known before.

According to the present invention, dual-polarimetric variables needed are obtained by directly using raw data without attenuation correction from transmission and reception data of X-band dual-polarimetric radar, and a signal-to-noise ratio is included in the dual-polarimetric variables. Then, a melting layer is determined considering the variables, and a membership function of a two-dimensional beta function form is selected. Therefore, hydrometeors are classified within a comparatively simple and practical range by obtaining a membership function value based on the variables and the membership function, processing the function value in a predetermined processing method of rules, and organizing and comparing a result thereof.

Based on the classification of precipitation, the specific differential phase is determined by applying a new distributive method to rainfall region and a conventional filtering method to mixed precipitation region, and rainfall is estimated using the specific differential phase in the section of rain, and thus the rainfall can be estimated accurately and simply compared to a conventional method.

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

Hereafter, the present invention will be described in more detail through the embodiments, referring to the accompanying drawings.

The present invention is obtained as a result of a study conducted based on the data obtained from dual-polarization X-band radar (HYDROX) for a study on hydrometeorology conducted by the NOAA Earth System Research Laboratory (ESRL) during Hydrometeorology Testbed (HMT) West 2005 and 2006 season in California.

First, in relation to the classification of hydrometeors, the present invention newly uses a signal-to-noise ratio (hereinafter, interchangeably used together with SNR) as an input variable compared to a conventional method using variables affected by attenuation, such as horizontal reflectivity, differential reflectivity and the like for classification of hydrometeors. The reason for using the SNR is to distinguish variability of dual-polarimetric parameters caused by changes in the SNR. For example, in a rain region having a high SNR, a correlation coefficient is a large value close to 1 in most cases, which is higher than a correlation coefficient in a mixed state region such as a region of rain or snow.

Figure 3:
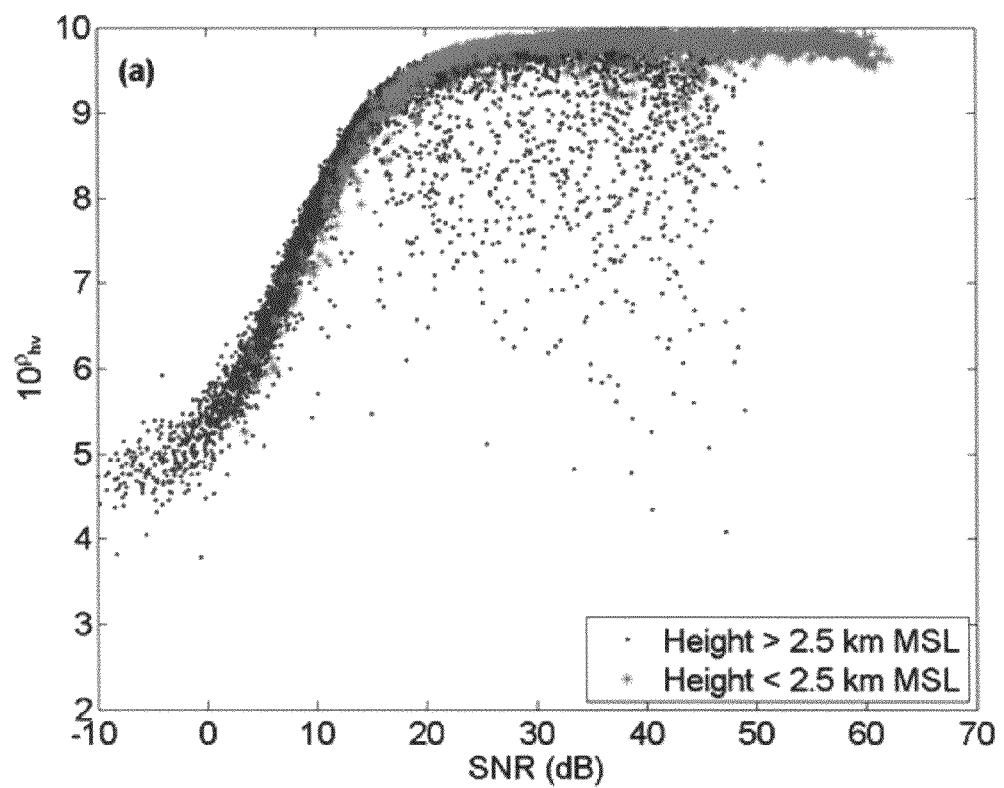
FIGS. 3 and 4 show distribution diagrams on two-dimensional planes of SNR and correlation coefficient and SNR and standard deviation of measured differential propagation phase of each radar measurement data based on the data of FIGS. 1 and 2.

However, as is shown in the data of FIG. 3, since the correlation coefficient in rainfall may be actually smaller than the correlation coefficient value in melting precipitation (mixed precipitation) at a low SNR, the correlation coefficient may be, for example, 0.93 in the rainfall of 10 dB, whereas the correlation coefficient may be 0.95 in a melting precipitation region having an SNR of 35 dB.

FIG. 3 shows SNRs of a period in which stratiform rain and convective rain showing a bright band are mixed and observation results distributed on a correlation coefficient plane. The blue dots mean all the data above 2.5 km from the sea level, including rain, snow and mixed type precipitation. The red dots mean only the data of a precipitation region (between 0.8 km and 2.5 km above sea level). The data of FIG. 3 show that a large portion of the distribution of the rainfall type category is overlapped with all types of precipitation categories, and this means that detecting a melting layer using a constant correlation coefficient is improper for a low SNR.

Accordingly, it is possible to classify rainfall from mixed precipitation across the entire region of SNR by combining the SNR and the correlation coefficient, and this is required to correctly determine a melting layer.

Although this method may operate in a relatively high frequency band from the S-band (2 to 4 GHz) to the X-band (8 to 12 GHz), since the correlation coefficient $\rho_{hv}$ and the differential propagation phase $\phi_{dp}$ in the X-band are more sensitive, this method is more useful in a relatively high frequency band such as the X-band. For example, a specific differential phase $K_{dp}$ (deg/km) to which these values are reflected is increased in the X-band three times as much as a value in the S-band.

A large number of hydrometeor classification methods based on dual-polarimetric radar variables have been developed during the last decade or more, and these methods are developed mainly for S-band or C-band frequencies. A method using dual-polarization observation properties, which is specialized for the X-band, also has been proposed recently. However, the present invention proposes a further robust hydrometeor classification method which can be applied in a relatively high frequency band such as X-band.

Figure 6:
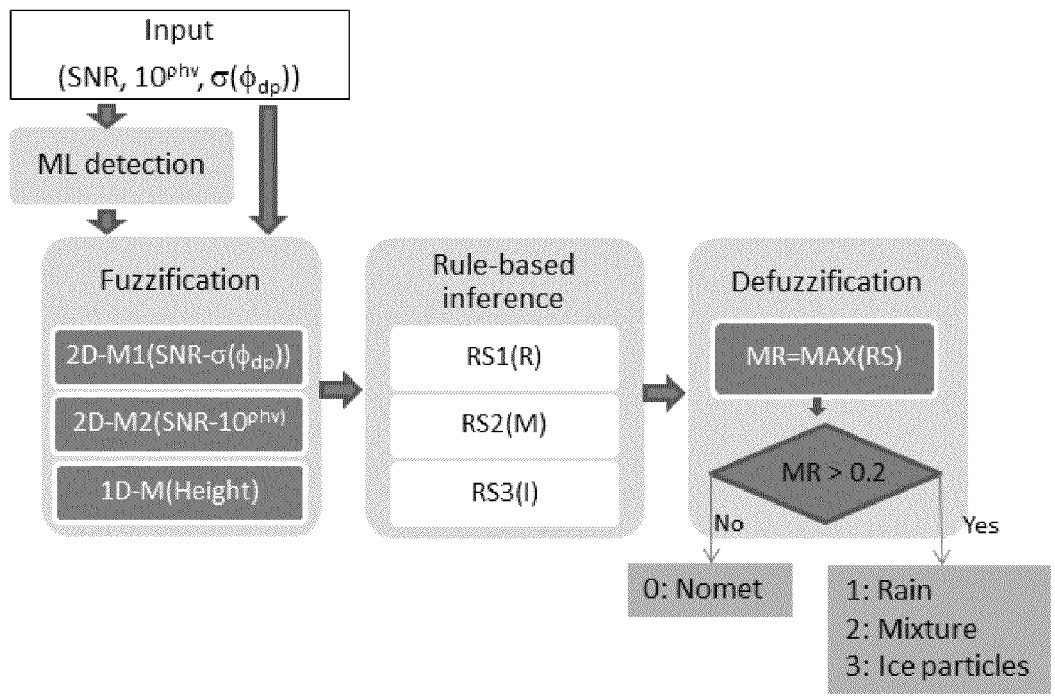
FIG. 6 is a flowchart illustrating the flow of some steps of the method of the present invention.
Figure 7:
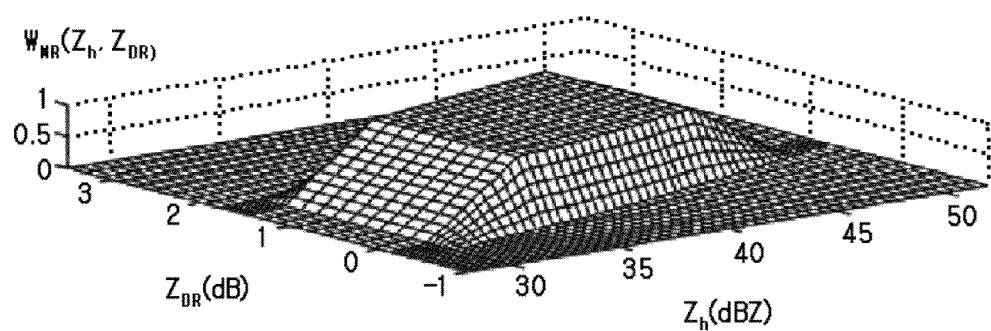
FIG. 7 is a graph showing an example of a two-dimensional membership beta function that can be used in the present invention.

FIG. 6 is a flowchart schematically illustrating a sequence of accomplishing some steps of the method according to an embodiment of the present invention.

According to FIG. 6, this classification method inputs a signal-to-noise ratio SNR, a correlation coefficient $\rho_{hv}$, and a differential propagation phase $\phi_{dp}$ obtained through radar measurement as input parameters and obtains values corresponding to four simple target categories, i.e., a meteorological target object, rain, a mixture of rain and snow and snow particles, as an output using the input parameters.

After inputting the input parameters, a melting layer is detected, and a fuzzification process is performed. In the fuzzification process, a two-dimensional beta membership function based on the relation between the $\sigma(\phi_{dp})$ and the SNR, a two-dimensional beta membership function based on the relation between the $10^{\rho_{hv}}$ and the SNR, and a one-dimensional beta membership function for the height H are determined, and function values for the input parameters are derived.

It is understood that if the function values are derived for these three beta membership functions, an inference step of obtaining inference values for hydrometeors including rain, a mixture of rain and snow and snow, a quality control step of performing quality control by selecting a maximum value among the inference values and comparing the maximum value with a predetermined value (determination of a non-meteorological target object), and a hydrometeor determination step of confirming a hydrometeor having the maximum value (defuzzification) are performed according to a determined rule.

The reason of using the signal-to-noise ratio as an input parameter in relation to the present invention is already mentioned above.

The properties of the measured differential propagation phase $\Psi_{dp}$ are efficient in classifying precipitation, ground clutter, anomalous propagation and biological scattering. This property values can be extended to detect melting particles. The property information can be obtained using a root mean square (RMS) of difference of radar observations in azimuth and distance as shown in the following equation.

$$\sigma(\psi_{dp}(r)) = \sqrt{\frac{\sum_{j=r-\frac{N}{2}}^{r+\frac{N}{2}}[\psi_{dp}(j \neq r) - \psi_{dp}(r)]^2}{N}} \quad \text{[Equation 16]}$$

Here, r denotes a position in a target region, j varies across a range of the gate length, and N denotes the number of resolution gates in the range or the number of measurement samplings for obtaining data. The gate is a basic unit when a radar signal received from a certain azimuth is processed by unit distance, and since one gate exists at every certain distance starting from the radar, it may be regarded as one pixel in radar signal processing. Although more precise data of high resolution can be accumulated if more gates are prepared in a short distance unit for the same target range, increase of the gate is limited since the processing capacity is limited. For example, seven gates having a length of 150 m are used.

In addition, the method proposed here is configured to include four principal aspects, i.e., melting layer detection, fuzzification, inference and defuzzification (a process of deriving a result that can be quantified within fuzzy logic, given fuzzy sets and membership degrees corresponding thereto).

In relation to the detection of the melting layer, when a radar beam passes from a lower rain region to an upper melting region, the correlation coefficient is abruptly dropped, and this information can be used to determine the height and depth of the melting layer. It is general that a region above a bright layer is determined as snow, the bright layer is determined as a mixture of rain and snow, and a region below the bright layer is determined as rain in many cases. This approach works well for a high SNR.

As is described above, a correlation coefficient is sensitive to an SNR value when the SNR value is low. Even in a rain region, a correlation coefficient value such as 0.9 smaller than 0.93, which is a correlation coefficient value of a mixed precipitation, may exist for a high SNR. Display of a melting layer using a constant correlation coefficient reference does not work properly at a low SNR.

In order to overcome such a difficult problem, the present invention proposes a further improved melting layer detection method described below. That is, here, the melting layer is detected by confirming boundary regions where measurement data are respectively belong to on the $10^{\rho_{hv}}$-SNR relation of FIG. 1 and the $\sigma(\Psi_{dp})$-SNR plane of FIG. 2. Height of the measurement data belonging to the mixed precipitation region is investigated, and if a mean value thereof is taken, a mean height and a mean depth of the melting layer (mixed precipitation region) can be obtained. The boundary regions, such as FIG. 1 and FIG. 2, which will be used here are secured in advance through an investigation research performed on a plurality of measurement results.

The detected mean height of the melting layer is used as an environment factor (temperature) in a hydrometeor classification system in a subsequent process.

In relation to the fuzzification, another advancement in the hydrometeor classification of the present invention is accomplished by adopting two two-dimensional beta membership functions by using variables such as $\sigma(\Psi_{dp})$, SNR and $10^{\rho_{hv}}$ (see the paper of Liu and Chandrasekar).

Figure 1:
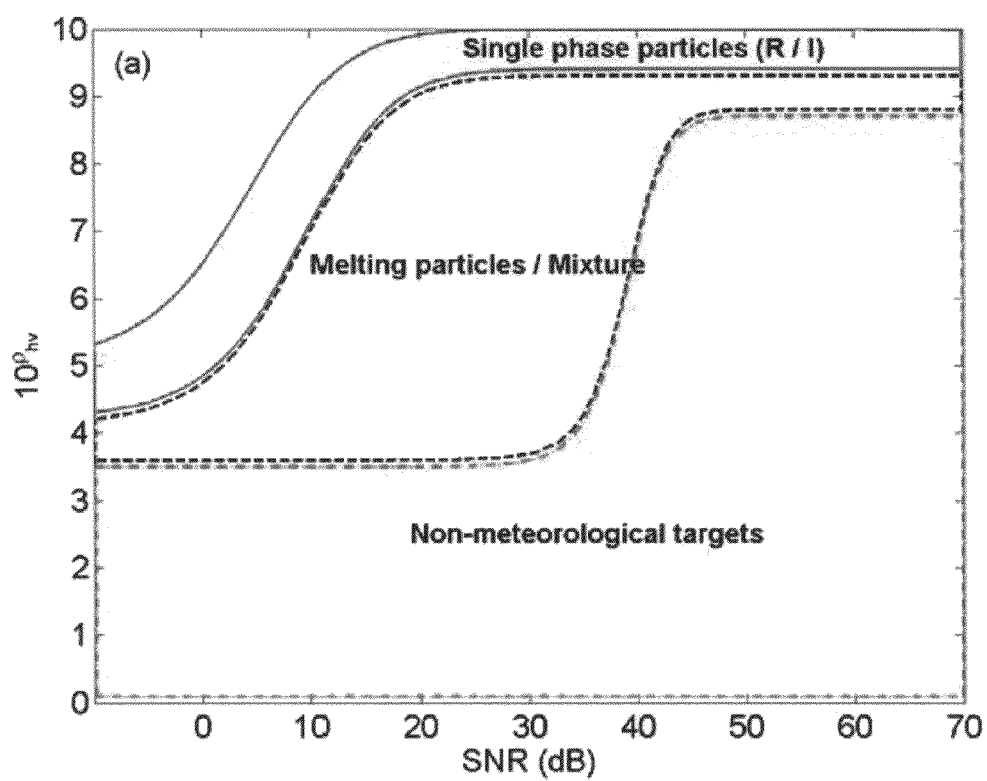
FIGS. 1 and 2 are graphs showing hydrometeor classification boundaries on two-dimensional planes of SNR and correlation coefficient and SNR and standard deviation of measured differential propagation phase based on HYDROX radar data.
Figure 2:
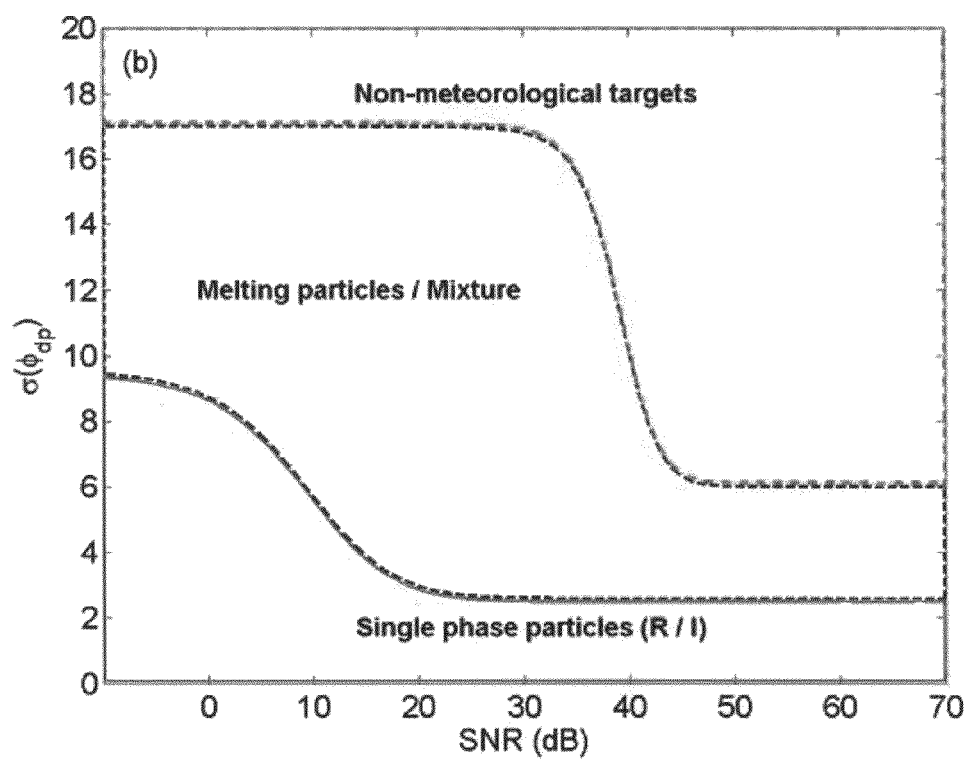

FIGS. 1 and 2 show two-dimensional beta membership functions derived by using dual-polarization X-band radar data (HYDROX data) of NOAA described above. Particularly, FIG. 2 shows $\sigma(\Psi_{dp})$ as a function of SNR, and FIG. 1 shows a correspondence relation between the $10^{\rho_{hv}}$ and the SNR. The classification boundary is obtained by using the HYDROX radar data. The process includes estimation of mean values of $\sigma(\Psi_{dp})$ and $10^{\rho_{hv}}$ according to the SNR and acquisition of an optimum relation according to the data.

However, it needs to consider that these two-dimensional beta membership functions are dependent on the characteristics of a radar system such as signal variation. Accordingly, adjustment of the two-dimensional beta membership functions can be accomplished for each radar system, and the adjustment is required. That is, it should be considered that, like existing fuzzy logic, a fuzzification function is not uniformly accomplished to be used for all cases.

The subsequent estimation (rule strength) step is determined by the equation shown below in this embodiment.

$$RS = f(H) \cdot (f(2D\text{-}MBF1) + f(2D\text{-}MBF2)) \qquad \text{[Equation 17]}$$

At this point, f denotes a fuzzification function, and H denotes a measured height. The fuzzification function is a beta function like equation 1 described above, and a one-dimensional membership function using height as variable (x) can be used. If a one-dimensional membership function is created like this according to the height of a melting layer, a fuzzification function value correctly applying a, b and m according to specific classification of height and hydrometeor of individual data can be obtained.

f(2D-MBF1) and f(2D-MBF2) are fuzzification functions for the $\sigma(\Psi_{dp})$-SNR relation and the $10^{\rho_{hv}}$-SNR relation, which means two-dimensional beta membership functions.

At the defuzzification step, if a maximum estimated value is smaller than 0.2, a target object of a corresponding location is determined as a non-meteorological or low signal target object. When the maximum estimated value is larger than 0.2, one of three hydrometeors of rain, a mixture snow and rain and snow having the maximum estimated value is determined. At this point, a number 0.2 acting as a reference is empirically obtained.

Whether or not the hydrometeor classification method is valid can be verified through existing data.

Figure 4:
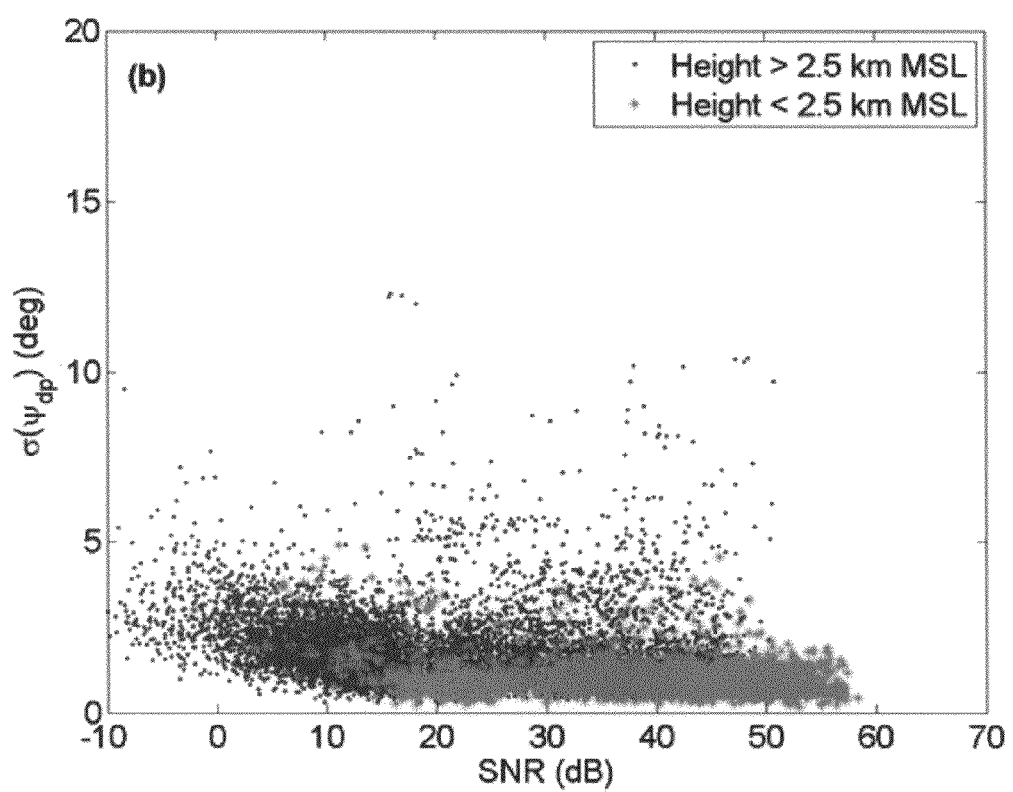
Figure 5:
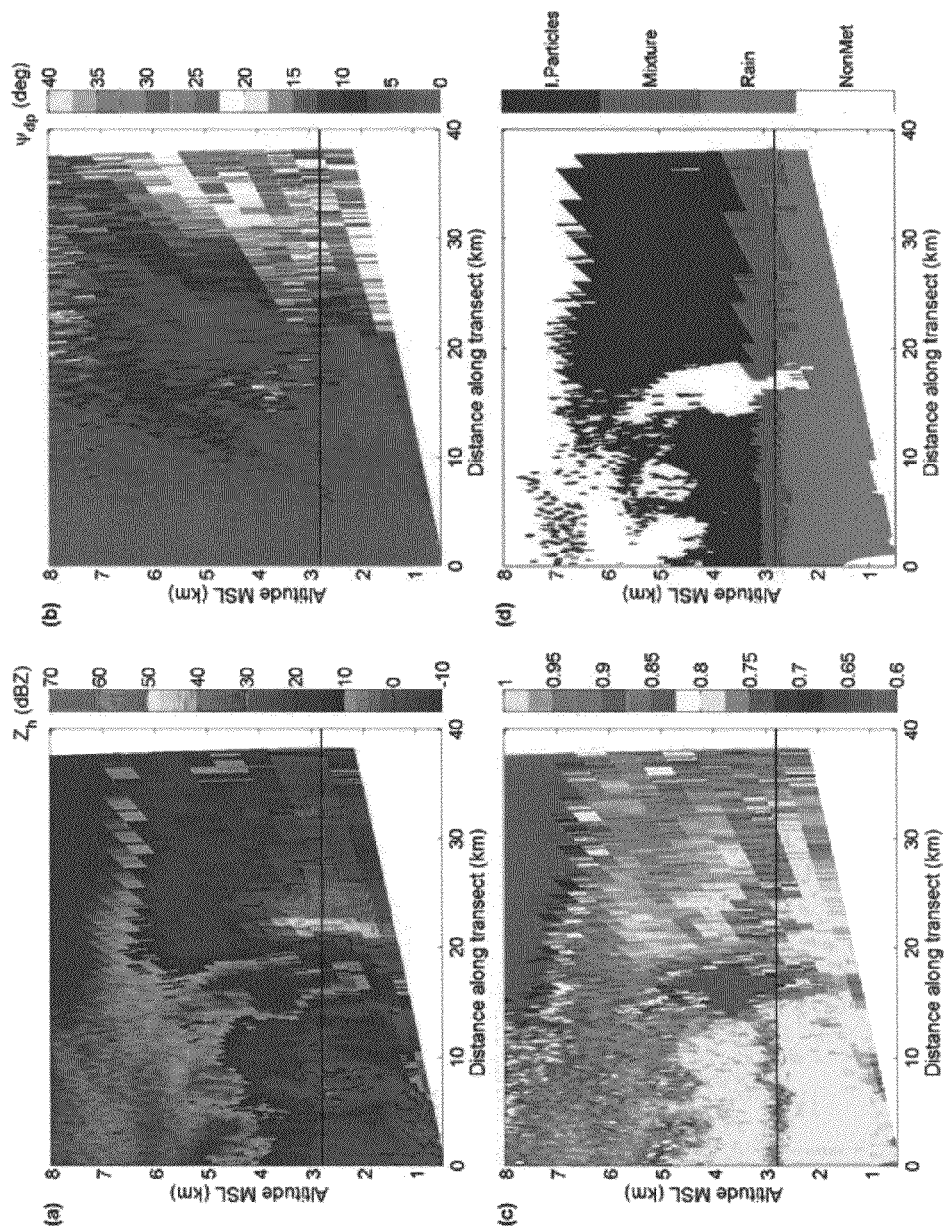
FIG. 5 shows radar observation data obtained at a specific region at a specific time point of conducting a study, i.e., horizontal reflectivity, a measured differential propagation phase and a cross correlation coefficient obtained at each position by transmitting electromagnetic waves while increasing an elevation angle at a predetermined azimuth from radar and receiving electromagnetic waves in a region of a predetermined distance and height, and hydrometeor types classified based on these values, which are displayed on the graphs in different colors.

Graphs (a) to (c) in FIG. 5 show horizontal reflectivity Zh, correlation coefficient $\rho_{hv}$ and measured differential propagation phase $\Psi_{dp}$ obtained from one meteorological observation data. These data are obtained during a period the same as a period of combined convective and stratiform precipitation shown in FIGS. 3 and 4, including rainfall occurred below about 2.8 km above sea level and snowfall above this height.

Existence of a noticeable melting layer approximately 2.8 km above the sea level is informed from the HYDROX data and a result of observing radio waves around vertically directed S-band.

This fact provides a perfect chance for testing the hydrometeor classification method of the present invention. A result of the classification of the proposed method is shown in graph (d) of FIG. 5. For the melting layer detected by the black line of each panel, observation data obtained in an about 18 km range from the X-band radar is compared with S-band radio observations. It could be found that the melting regions observed in the S-band and the X-band match well. Based on the properties of the melting layer, it is understood that the result of classification shown in graph (d) of FIG. 5 is proper.

After the hydrometeors are classified, it needs to acquire a specific differential phase for rainfall estimation.

It is known that since the specific differential phase is less sensitive to the drop size distribution (DSD), the specific differential phase may estimate a relatively further precise rainfall compared to a conventional reflectivity-rainfall intensity approach. Furthermore, the specific differential phase is also less sensitive to hail.

In addition, owing to the characteristic of becoming more sensitive at the X-band compared to the S-band or C-band of the measured differential propagation phase, the specific differential phase may outperform the rainfall estimation from the reflectivity-rainfall intensity approach at the high frequency band.

However, the specific differential phase has some disadvantages as described above, and, for example, the specific differential phase is conventionally calculated across a path, not in each individual gate region.

Conventionally, the specific differential phase is calculated as a mean slope of an amount accumulated across the gate region of the measured differential propagation phase and best fit across a specific path length. In order to estimate the specific differential phase from the accumulation of the measured differential propagation phase, Golestani et al. (Golestani, Y., V. Chandrasekar, and V. N. Bringi: 1989) used a filtering technique. This method works well in a rain region where microphysical properties are changing smoothly like in stratiform rain.

However, in an intense convective region, the method may result in an underestimated peak of the specific differential phase, and a value of the specific differential phase can become a negative value, and the value of the specific differential phase may vary greatly in a low rain rate region due to significant signal variations (Wang and Chandrasekar).

They (Wang and Chandrasekar) proposed an adaptive algorithm for suppressing noise associated variations in a small specific differential phase segment and suppressing biased estimation in a large specific differential phase segment. This algorithm adaptively incorporates regression errors through scaling in estimating a specific differential phase. This method allows calculation (retrieval) of improved peak values of the specific differential phase in a heavy rainfall region, as well as in a light rainfall region having a higher signal variation.

However, this method is based on a filtering technique and may not be efficient for eliminating the problem of backscatter phase shift and negative value of the specific differential phase.

Accordingly, an advanced specific differential phase estimation method which combines a conventional filtering method used for a melting region and a new self-consistent method used only for rain is proposed here.

The reason for using a conventional filtering method for the melting region is that variations of particle density and drop size distribution (DSD) are too large to derive a reliable result using a profiling method.

The specific differential phase distribution method is configured to incorporate attenuation-corrected horizontal reflectivity and a total difference of differential phase in a rain region in order to provide a specific differential phase at all range gates (gate) as described below.

In the self-consistent method, attenuation-corrected horizontal reflectivity is obtained first from the measured horizontal reflectivity through the equations shown below, and a specific differential phase is acquired using the attenuation-corrected horizontal reflectivity.

Here, the values of beta β and gamma γ are 0.76 and 0.31, respectively, and these values are obtained through a theoretical simulation based on a drop shape model for a drop size distribution (0.5≤D≥3.0, 3≤log$_{10}$N$_w$≥5, −1≤μ≥4) varying in a wide range at a temperature of 10° C., which is presented in the paper of Brandes et al. in 2004.

$$\hat{\alpha}_h(r) = \frac{[Z_h(r)]^\beta (10^{0.1\beta\hat{A}_h(r_0-r_m)} - 1)}{I(r_0; r_m)\_(10^{0.1\beta\hat{A}_h(r_0-r_m)} - 1)I(r_0; r_m)}$$ [Equation 18]

The specific attenuation coefficient $\alpha_h$ is a very useful parameter for rainfall estimation, and its application can be referenced from documents (Bringi and Chandrasekar 2001; Ryzhkov et al. 2011).

$$\hat{A}_h(r_0-r_m) = \gamma(\psi_{dp}(r_m) - \psi_{dp}(r_0))$$ [Equation 19]

$$I(r_0; r_m) = 0.46\beta \int_{r_0}^{r_m} [Z_h(h)]^\beta dr$$ [Equation 20]

At this point, $r_0$ and $r_m$ indicate beginning and end of a range of rain echo, respectively.

$$10 \log_{10}(\hat{Z}_h(r)) = 10 \log_{10}(Z_h'(r)) + 2\int_{r_0}^{r} \hat{\alpha}_h(s)ds$$ [Equation 21]

After attenuation correction of the horizontal reflectivity is completed, the specific differential phase is estimated as shown in the following equation.

$$\hat{K}_{dp}(r) = a[\hat{Z}_{dp}(r)]^b; a = \frac{(\psi_{dp}(r_m) - \psi_{dp}(r_0))}{2\int_{r_0}^{r_m} [\hat{Z}_h(r)]^b ds}$$ [Equation 22]

In the specific differential phase-horizontal reflectivity relation, a value of 'b' is relatively constant, whereas a value of 'a' varies significantly according to temperature and drop shape distribution. Here, the value of 'b' is 0.76, and parameter 'a' is obtained for each radar ray from a total difference of differential phase which is a difference of the measured differential propagation phase within the rain region and sum of the corrected horizontal reflectivity.

Figure 8:
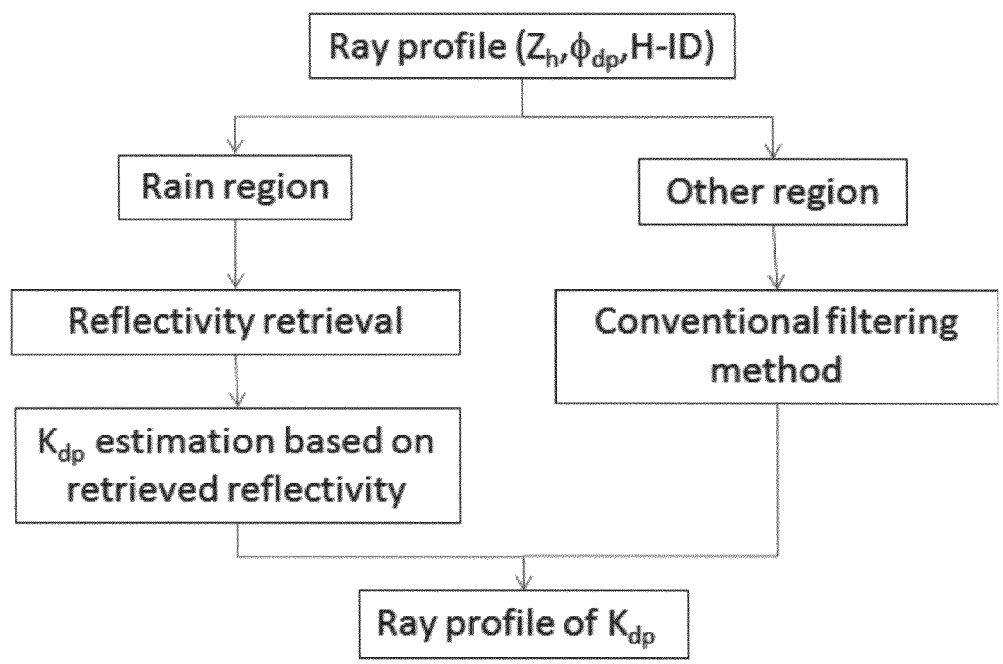
FIG. 8 is a view showing the configuration of a specific differential phase acquisition system.

FIG. 8 is a view showing the configuration of a specific differential phase acquisition system.

Figure 9:
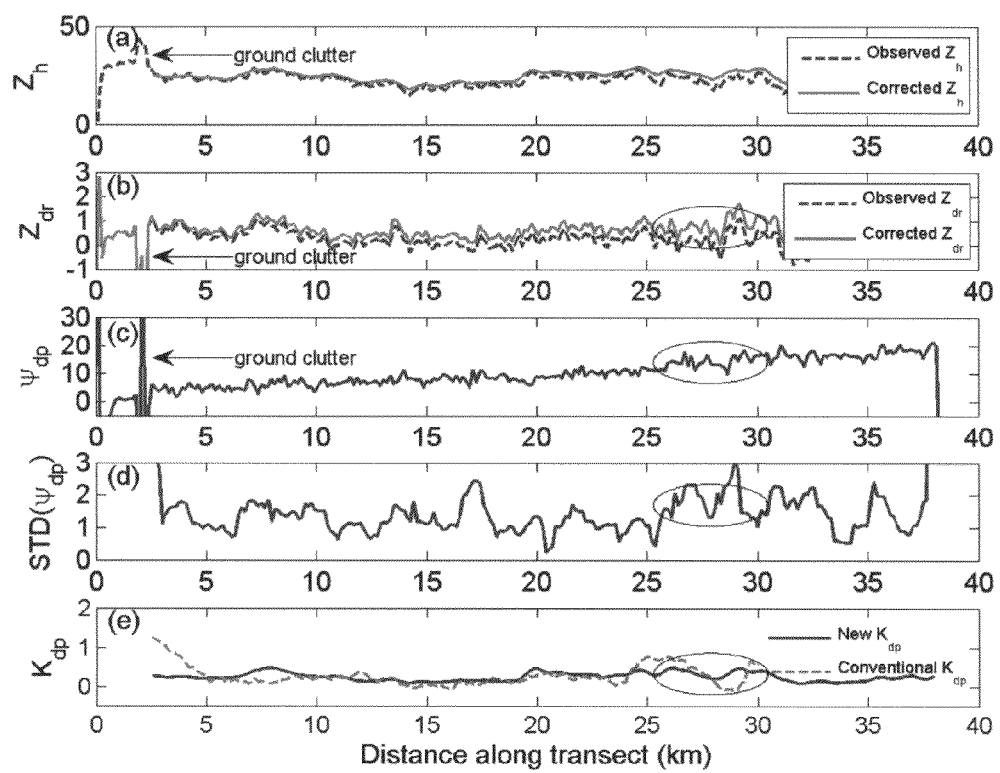
FIG. 9 shows ray profiles of observed and corrected horizontal reflectivity and differential reflectivity, a measured differential propagation phase and a standard deviation thereof, and a specific differential phase calculated in a conventional filtering method and a specific differential phase of a new method, using HYDROX radar data of a specific height, azimuth and distance range collected at 1459:21 UTC 31 Dec. 2005.

To review the proposed algorithm, HYDROX radar data of a specific height, azimuth and distance range collected at 1459:21 UTC 31 Dec. 2005 are used. FIG. 9 shows examples of estimated specific differential phase rays in the stratiform rain of the radar data. Graph (a) and graph (b) in FIG. 9 show profiles of observed and corrected rays for the horizontal reflectivity and the differential reflectivity (attenuation correction is performed after smoothing the observed horizontal reflectivity using a 1.5 km range filter). Graph (c) and graph (d) in FIG. 9 show ray profiles performed at 1.5 km intervals for the standard deviation of the measured differential propagation phase. Graph (e) in FIG. 9 shows specific differential phases estimated using the proposed method (blue solid line) and the conventional filtering method (red dotted line; Hubbert and Bringi 1995). The conventional filtering method has been carried out on all measured data for a ray having a correlation coefficient exceeding 0.9 within a 4.5 km range width (Matrosov et al. 2007). The elevation of the ray is below the melting layer across the entire path length, so that the precipitation shown in FIG. 9 corresponds to rainfall. With the exception of the spikes shown in Graphs (a) and (c) of FIG. 9 in a range of approximately 2 km from the radar, since the data are estimated as stratiform rain, the differential propagation phase measured at a relatively uniform rate across the path length is increased, and thus relatively stable horizontal reflectivity is shown. The values of the horizontal reflectivity and the measured differential propagation phase which look large at a 2 km range mean ground clutter. Most of the ground clutter can be eliminated using a correlation coefficient. However, not surprisingly, the value of the specific differential phase estimated using the conventional filtering technique shown in graph (e) of FIG. 9 is shown to be large in the vicinity of the ground clutter. It is induced by smoothing the measured differential propagation phase showing large values at the neighboring range gates within the ground clutter region.

Simple ground clutter filtering based on absolute values of the correlation coefficient and the Doppler velocity constraint is a method typically used for conventional specific differential phase estimation from the HYDROX data (Matrosov 2010).

The new method is not significantly affected by the measured differential propagation phase of the ground clutter. It is since that this method uses horizontal reflectivity in the acquisition process which is not affected by neighboring ground clutter of the same angle. In addition, the new method provides more reasonable specific differential phase values at 5 to 10 km and 25 to 30 km ranges as compared with the attenuation-corrected horizontal reflectivity. The reason of the large specific differential phase variation in the conventional method at the 25 to 301 cm range (refer graph (e) of FIG. 9) is that sharp DSD variation induces large backscatter and creates a large vibration in the measured differential propagation phase. As shown in graph (b) of FIG. 9, it is understood that variability of the specific differential phase is increased between 25 and 32 km. Hence, it may be said that drop size variability is increased at these ranges and changes in the backscatter phase shift are generated at this range. At the ranges outside the 20 to 30 km range, the standard deviation of the measured differential propagation phase is between 1° and 2° which generally indicates a stable state.

Figure 10:
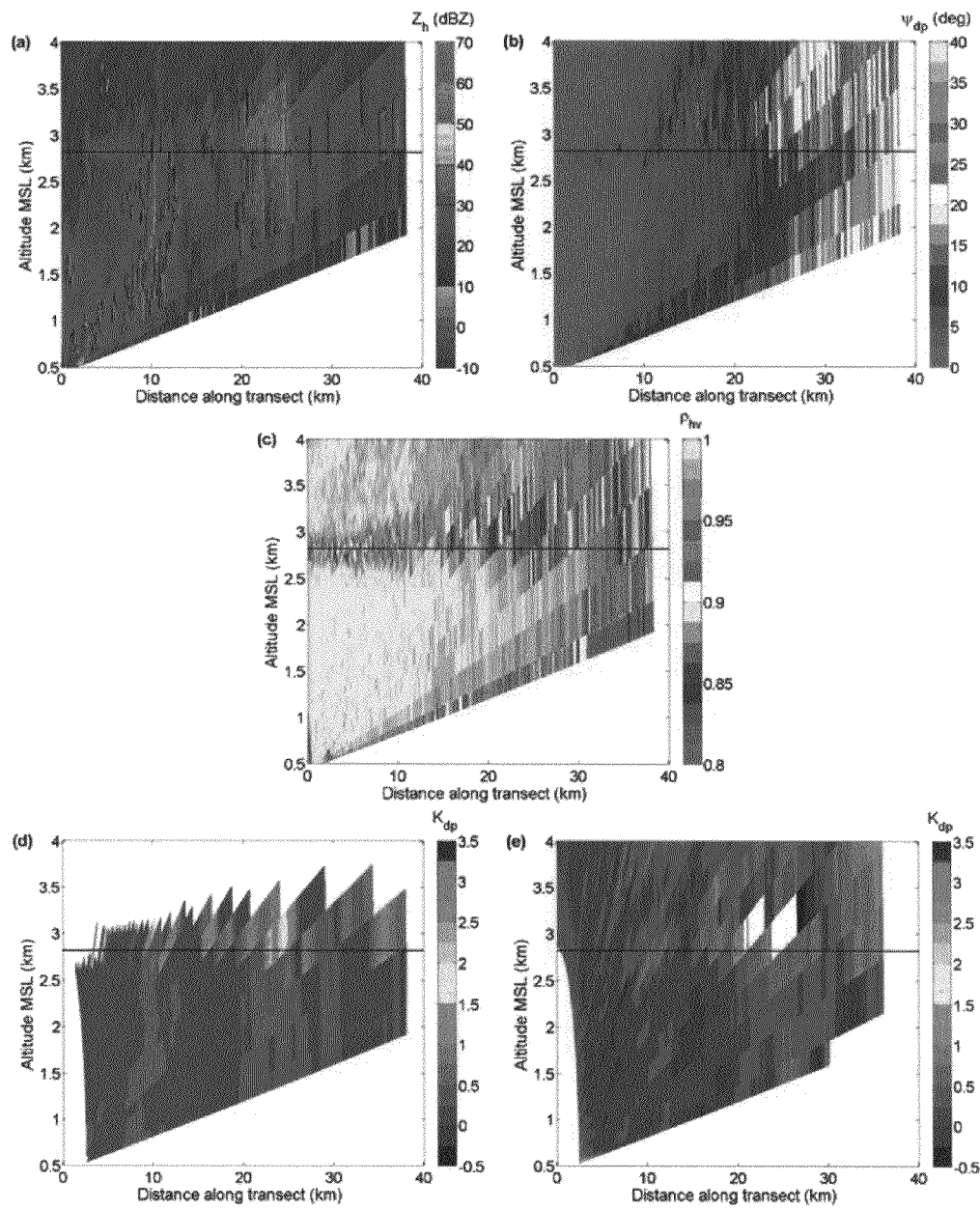
FIG. 10 shows a result of the entire Range Height Indicator (RHI, vertical direction scan) including radar observation values and the rays shown in FIG. 8, in which graphs (a) to (c) relate to the horizontal reflectivity, the measured differential propagation phase and the correlation coefficient, and graphs (d) and (e) relate to the specific differential phase obtained by a new method and the specific differential phase obtained by a conventional filtering method.

FIG. 10 shows radar observation values (observed horizontal reflectivity, measured differential propagation phase, and correlation coefficient) and specific differential phase estimation results for the entire RHI (vertical direction scan) including the rays shown in FIG. 9. Graphs (a) to (c) in FIG. 10 show the horizontal reflectivity, the measured differential propagation phase and the correlation coefficient, respectively, whereas the specific differential phase acquired by the new technique and the specific differential phase acquired by the conventional method are shown in graphs (d) and (e) of FIG. 10. The melting layer is at a height of 2.8 km above sea level, so that the RHI (vertical direction scan) includes rain (means only rain below the melting layer), mixed precipitation (a precipitation form within the melting layer), and snow (a precipitation form above the melting layer) expressed by the slope of the correlation coefficient. The specific differential phase acquisition method proposed here is used in the rain-only region and in the melting region. In contrast, the conventional method is applied to all regions where the correlation coefficient exceeded 0.95.

For additional evaluation, the new methodology and the filtering method (Hubbert and Bringi, 1995) are compared for all events observed during 30-31 Dec. 2005 mentioned above. This is the most significant event observed in the 2005/06 HMT-West field season, which is a period including major floods occurred on both sides of Sierra Nevada. During this 24-hour event, a rainfall of 160 to 200 mm causing a massive local flood has rained in the ARB basin.

Figure 11:
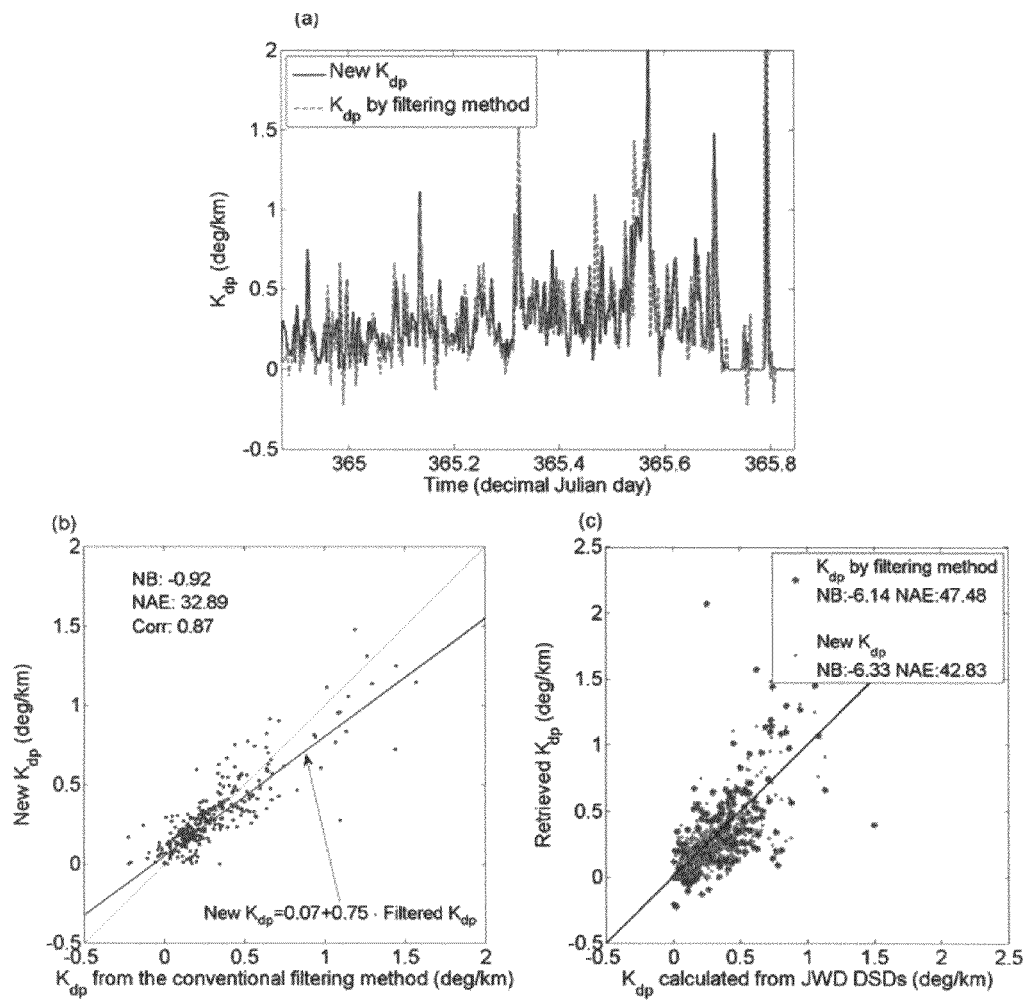
FIG. 11 shows a result of a specific differential phase obtained in time series by graph (a) and dispersion of the specific differential phase for the 2005/06 HMT-West field season of 30 and 31 Dec. 2005 by graph (b), and graph (c) in FIG. 11 shows the obtained specific differential phase and a specific differential phase calculated from JWD DSD.

FIG. 11 shows a specific differential phases acquired by two estimation methods and a specific differential phase obtained from a ground instrument [a Joss-Waldvogel disdrometer (JWD)] at a resolution gate above the HMT-West Colfax (CFC) site (at 2.4° of radar elevation). The CFC site is located at a distance about 18 km from the HYDROX radar. Graphs. (a) and (b) in FIG. 11 show a result of a specific differential phase obtained in time series and dispersion of the specific differential phase for 30 and 31 Dec. 2005, and graph (c) in FIG. 11 shows an obtained specific differential phase and a specific differential phase calculated from JWD DSD. The solid lines show the specific differential phases acquired by the new method, and the dotted lines show the specific differential phases acquired by the conventional filtering method. The time range on the x-axis is approximately 24 hours (starting at 2053:00 UTC 30 Dec. 2005 and ending at 1953:00 UTC 31 Dec. 2005).

For statistical analysis, a normalized bias (NB), a normalized absolute error (NAE), a correlation coefficient, and a linear regression parameters are used. The NB and the NAE between two parameters X and Y are defined as shown below.

$$NB = \frac{\langle X - Y \rangle}{\langle Y \rangle} \times 100\% \quad \text{[Equation 23]}$$

$$NAE = \frac{\langle |X - Y| \rangle}{\langle Y \rangle} \times 100\% \quad \text{[Equation 24]}$$

Here, the angle brackets mean averaging.

The NB, the NAE and the correlation coefficient between the new specific differential phase and the filtered specific differential phase are −0.92%, 32.89% and 0.87, respectively. The linear regression equation is as shown below.

$$\text{New}K_{dp} = 0.07 + 0.75 \cdot \text{Filtered}K_{dp} \quad \text{[Equation 25]}$$

From the results of graph (e) in FIG. 9, graph (d) of FIG. 10 and graphs of FIG. 11, it is understood that the proposed algorithm generates less noise and provides further stable results compared with a conventional filtering technique. In addition, the proposed method provides only positive specific differential phases for a rain region.

Hereinafter, precipitation estimation using the specific differential phase (a specific differential phase for a precipitation region) obtained above will be described.

A large number of studies have been conducted on the specific differential phase derived from the differential propagation phase measured in advance to be applied to precipitation estimation (e.g., Bringi and Chandrasekar 2001; Ryzhkov et al. 2005; Matrosov et al. 2005; Matrosov 2010; Wang and Chandrasekar 2010), and these studies show promising results. These prior studies show that the specific differential phase has some advantages in precipitation estimation compared with other radar variables such as horizontal reflectivity and differential reflectivity. Particularly, it is more advantageous at a high frequency such as X-band.

That is, the specific differential phase is almost unaffected by beam blockage and is not sensitive to the effect of attenuation, as well as the uncertainty of radar calibration. The relation between the rainfall rate (rainfall intensity) measured by millimeters per hour and the specific differential phase (deg/km) is described as $R = c(K_{dp})^d$.

In the present invention, c=17 and d=0.73 are used as parameters based on the paper of Matrosov (2010). In order to evaluate the specific differential phase for deriving rainfall, instantaneous and cumulative rainfalls of the conventional method are compared with those of the proposed method using ground surface rainfall measurement values and grain size analysis data. The data used for the evaluation are acquired from the HMT observation event described above.

Figure 12:
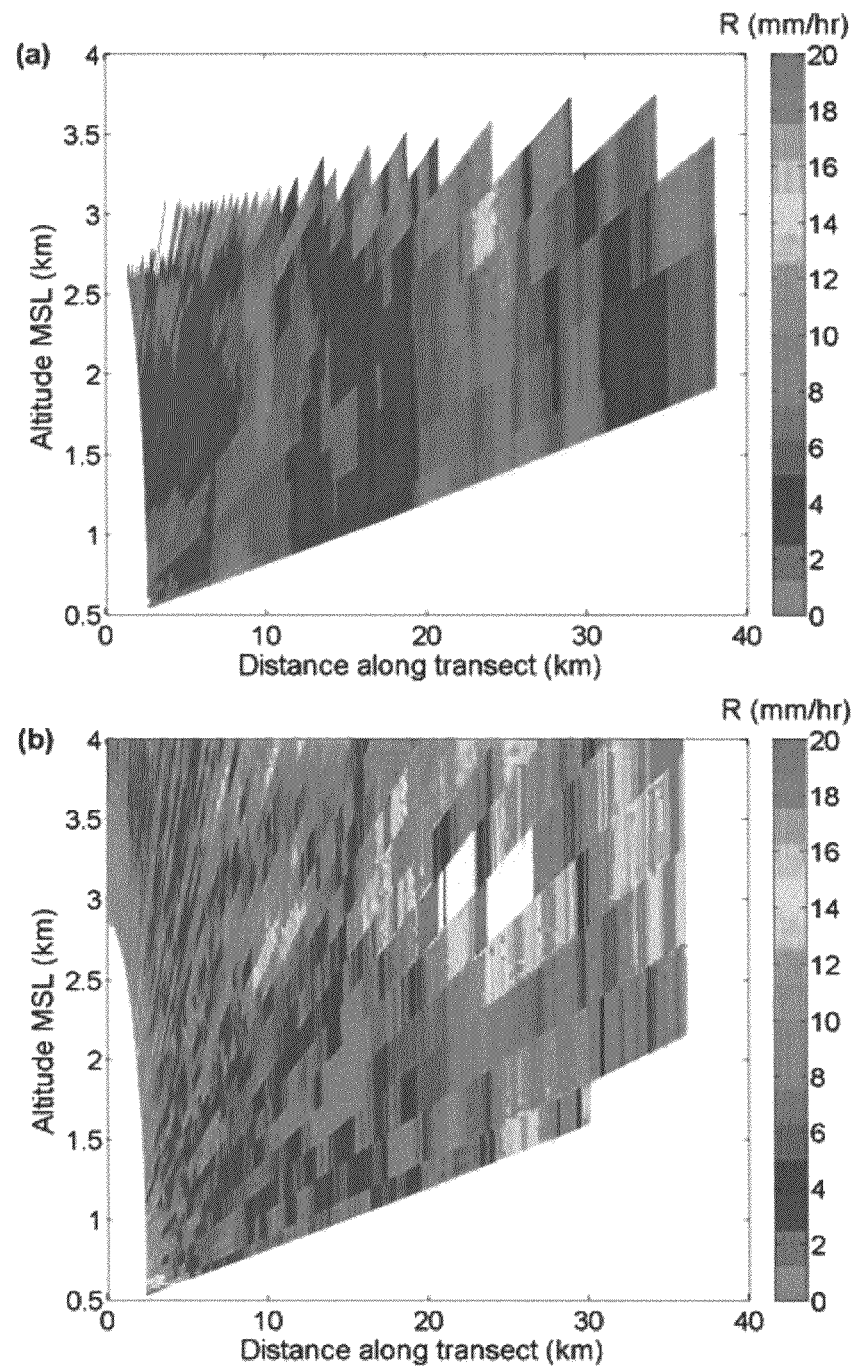
FIG. 12 shows an example of RHI scan (1459:21 UTC 31 Dec. 2005) of rainfall estimation corresponding to graphs (d) and (e) of FIG. 10, in which graph (a) of FIG. 12 shows a new specific differential phase, and graph (b) of FIG. 12 shows rainfall estimation using a specific differential phase in a conventional filtering method.

FIG. 12 shows comparison of instantaneous rainfall estimation from the relation according to two induction methods of the specific differential phase. Graph (a) in FIG. 12 shows rainfall estimated by the new method, and graph (b) in FIG. 12 shows rainfall estimated by the conventional method. Results of FIG. 12 mean that the rainfall rate measured by the new method shows a smoother vertical shape.

Figure 13:
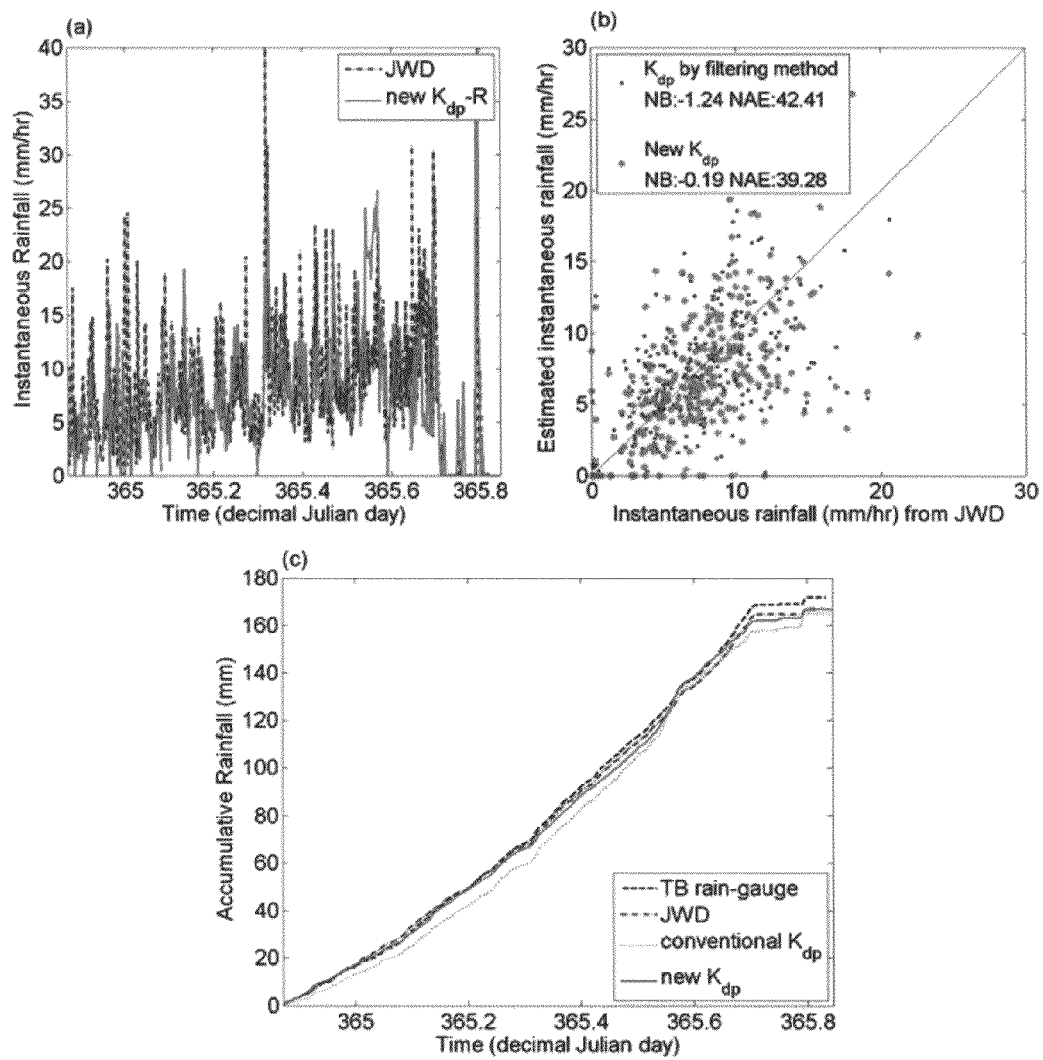
FIG. 13 shows the values calculated from estimation of rainfall rate-specific differential phase corresponding to FIG. 11, in which graph (a) of FIG. 13 is a graph showing time series, graph (b) of FIG. 13 is a graph showing dispersion of instantaneous rainfall, and graph (c) of FIG. 13 is a graph showing dispersion of accumulated rainfall and a ground rainfall measurement value (JWD) and a rain gauge at the CFC point.

FIG. 13 shows comparison of instantaneous rainfall and accumulative rainfall with those of FIG. 11 based on the rain rate-specific differential phase relation using a ground measurement instrument (a JWD and a standard 0.01" tipping-bucket rain gauge at the CFC site).

From the results of FIG. 13, it can be confirmed that the new specific differential phase works well compared with the ground observation. The NB and the NAE of the rainfall estimated from the new specific differential phase are 0.19% and 39.28%. The NB and the NAE obtained from the filtered specific differential phase are 0.24% and 42.41%. In addition, data of the rain gauge perfectly correspond to the accumulated values derived from the ground measurement instrument (JWD).

In conclusion, rainfall estimation using a specific differential phase at the X-band seems to be relatively successful. In the present invention, reliability and robustness of the estimation method are improved compared with a conventional precipitation estimation method. Particularly, the rainfall estimation is appropriately adapted to complex terrains by reducing contamination of ground clutter when a specific differential phase is acquired, and a new method of classifying hydrometeors and a new method of calculating a specific differential phase for X-band dual-polarimetric radar are disclosed. The effect of the improved method disclosed in the present invention is proved by evaluating the method in a complex terrain using data observed in the 2005-06 HMT-West field project.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An integrated rainfall estimation method using X-band dual-polarimetric radar measurement data, the method comprising:
a precipitation classification step of classifying hydrometeors into four types of snow, rain/snow, rain and non-meteorological target through a fuzzy logic technique using a correlation coefficient (cross correlation coefficient, $\rho_{hv}$), features of a measured differential propagation phase ($\Psi_{dp}(r)$) or differential propagation phase ($\phi_{dp}$) and a signal-to-noise ratio (SNR) as input variables (input feature vector);
a specific differential phase estimation step of estimating a specific differential phase using a total difference of differential phase in rain region and signal-attenuation corrected reflectivity for the rain among the hydrometeors classified at the precipitation classification step and using a filtering method for the other hydrometeors; and
a rainfall calculation step of estimating rainfall using a relation between the specific differential phase separately estimated in the specific differential phase estimation step and the rainfall.

2. The method according to claim 1, wherein the precipitation classification step includes the steps of:
obtaining the signal-to-noise ratio (SNR), the correlation coefficient ($\rho_{hv}$) and the measured differential propagation phase ($\Psi_{dp}(r)$) as initial input data (variables) through radar electromagnetic wave transmission and reception data;
classifying a melting layer and obtaining a mean height and a mean depth of the melting layer;
determining a two-dimensional fuzzy function of a $\sigma(\Psi_{dp})$-SNR relation and a $10^{\rho_{hv}}$-SNR relation and calculating two fuzzy values (fuzzy function values) using the fuzzy function (fuzzification step);
obtaining, after the fuzzification, an inference value for each target using a fuzzy value of the height and the previous two two-dimensional fuzzy values (fuzzy function values according to the $\sigma(\Psi_{dp})$-SNR and $10^{\rho_{hv}}$-SNR relations) (inference step); and
performing quality control and determining a hydrometeor by selecting a maximum inference value (Max(RS)) among the inference values.

3. The method according to claim 2, wherein the step of classifying a melting layer and obtaining a mean height and a mean depth of the melting layer classifies measurement data belonging to a melting layer region by confirming where individual observation data for obtaining the signal-to-noise ratio (SNR), the correlation coefficient ($\rho_{hv}$) and the measured differential propagation phase ($\Psi_{dp}(r)$) as initial input variables belongs to among boundary regions determined to classify the hydrometeors on a $\sigma(\Psi_{dp})$-SNR plane and a $10^{\rho_{hv}}$-SNR plane, and calculates a mean height and a mean depth of the melting layer from the measurement data belonging to the melting layer region, and the step of obtaining the inference value obtains an inference value using equation 1 shown below as an inference rule $$RS = f(H) \cdot (f(2D\text{-}MBF1) + f(2D\text{-}MBF2)), \quad \text{Equation 1}$$

where, f denotes a fuzzification function, H denotes a measured height, and f(2D-MBF1) and f(2D-MBF2) are two-dimensional beta membership functions for the $\sigma(\Psi_{dp})$-SNR relation and the $10^{\rho_{hv}}$-SNR relation, respectively.

4. The method according to claim 3, wherein the specific differential phase estimation step estimates the specific differential phase using the total difference of differential phase in rain region and the signal-attenuation corrected reflectivity as shown in equation 2

$$\hat{K}_{dp}(r) = s[\hat{Z}_h(r)]^b; \quad a = \frac{(\psi_{dp}(r_m) - \psi_{dp}(r_0))}{2\int_{r_0}^{r_m}[\hat{Z}_h(r)]^b ds} \quad \text{Equation 2}$$

5. The method according to claim 4, wherein calculating rainfall through the obtained specific differential phase is accomplished using a relation between the specific differential phase and rainfall intensity, and the relation between the rainfall intensity (R) and the specific differential phase (deg/km) uses equation $R=c(K_{dp})^d$ (c and d are empirically calculated constants).

6. The method according to claim 2, wherein the specific differential phase estimation step estimates the specific differential phase using the total difference of differential phase in rain region and the signal-attenuation corrected reflectivity as shown in equation 2

$$\hat{K}_{dp}(r) = s[\hat{Z}_h(r)]^b; \quad a = \frac{(\psi_{dp}(r_m) - \psi_{dp}(r_0))}{2\int_{r_0}^{r_m}[\hat{Z}_h(r)]^b ds} \quad \text{Equation 2}$$

7. The method according to claim 2, wherein calculating rainfall through the obtained specific differential phase is accomplished by using a relation between the specific differential phase and rainfall intensity, and the relation between the rainfall intensity (R) and the specific differential phase (deg/km) uses equation $R=c(K_{dp})^d$ (c and d are empirically calculated constants).

8. The method according to claim 1, wherein the specific differential phase estimation step estimates the specific differential phase using the total difference of differential phase in rain region and the signal-attenuation corrected reflectivity as shown in equation 2

$$\hat{K}_{dp}(r) = s[\hat{Z}_h(r)]^b; \quad a = \frac{(\psi_{dp}(r_m) - \psi_{dp}(r_0))}{2\int_{r_0}^{r_m}[\hat{Z}_h(r)]^b ds} \quad \text{Equation 2}$$

9. The method according to claim 1, wherein calculating rainfall through the obtained specific differential phase is accomplished by using a relation between the specific differential phase and rainfall intensity, and the relation between the rainfall intensity (R) and the specific differential phase (deg/km) uses equation $R=c(K_{dp})^d$ (c and d are empirically calculated constants).

10. An integrated rainfall calculation method using X-band dual-polarimetric radar measurement data, the method comprising:
a precipitation classification step of classifying hydrometeors into four types of snow, rain/snow, rain and non-meteorological target through a fuzzy logic technique using a correlation coefficient (cross correlation coefficient, $\rho_{hv}$), features of a measured differential propagation phase ($\Psi_{dp}(r)$) or differential propagation phase ($\phi_{dp}$) and a signal-to-noise ratio (SNR) as input variables (input feature vector);
a specific differential phase estimation step of estimating a specific differential phase using a total difference of differential phase in rain region and signal-attenuation corrected reflectivity for the rain among the hydrometeors classified at the precipitation classification step and using a filtering method for the other hydrometeors; and
a rainfall calculation step of calculating rainfall by using a relation between the specific differential phase separately estimated in the specific differential phase estimation step and the rainfall, wherein the precipitation classification step includes the steps of:

obtaining the signal-to-noise ratio (SNR), the correlation coefficient ($\rho_{hv}$) and the measured differential propagation phase ($\Psi_{dp}(r)$) as initial input data (variables) through radar electromagnetic wave transmission and reception data;

classifying a melting layer and obtaining a mean height and a mean depth of the melting layer;

determining a two-dimensional fuzzy function of a $\sigma(\Psi_{dp})$-SNR relation and a $10^{\rho_{hv}}$-SNR relation and calculating two fuzzy values (fuzzy function values) using the fuzzy function (fuzzification step);

obtaining, after the fuzzification, an inference value for each target using a fuzzy value of the height and the previous two two-dimensional fuzzy values (fuzzy function values according to the $\sigma(\Psi_{dp})$-SNR and $10^{\rho_{hv}}$-SNR relations) (inference step); and performing quality control and determining a hydrometeor by selecting a maximum inference value (Max(RS)) among the inference values, wherein the step of classifying a melting layer in atmosphere and calculating a height and a distribution characteristic (a melting depth) of the melting layer classifies measurement data belonging to a melting layer region by confirming where individual observation data for obtaining the signal-to-noise ratio (SNR), the correlation coefficient ($\rho_{hv}$) and the measured differential propagation phase ($\Psi_{dp}(r)$) as initial input variables belongs to among boundary regions determined to classify the hydrometeors on a $\sigma(\Psi_{dp})$-SNR plane and a $10^{\rho_{hv}}$-SNR plane, and calculates a mean height and a mean depth of the melting layer from the measurement data belonging to the melting layer region, and the inference step obtains an inference value using equation 1 shown below as an inference rule, and the specific differential phase estimation step estimates the specific differential phase using a total specific differential phase and signal-attenuation corrected reflectivity using equation 2, and calculating rainfall through the obtained specific differential phase is accomplished using a relation between the specific differential phase and rainfall intensity, and the relation between the rainfall intensity (R) and the specific differential phase (deg/km) uses equation R=c $(K_{dp})^d$ (c and d are constants calculated empirically), $$RS = f(H) \cdot (f(2D-MBF1) + f(2D-MBF2)), \quad \text{Equation 1}$$

here, f denotes a fuzzification function, H denotes a measured height, and f(2D-MBF1) and f(2D-MBF2) are two-dimensional beta membership functions for the $\sigma(\Psi_{dp})$-SNR relation and the $10^{\rho_{hv}}$-SNR relation, respectively, and $$\widehat{K}_{dp}(r) = s\left[\widehat{Z}_h(r)\right]^b ; a = \frac{(\psi_{dp}(r_m) - \psi_{dp}(r_0))}{2\int_{r_0}^{r_m}\left[\widehat{Z}_h(r)\right]^b ds}.$$

\* \* \* \* \*